US006712414B2

(12) United States Patent
Morrow (10) Patent No.: US 6,712,414 B2
(45) Date of Patent: Mar. 30, 2004

(54) MOBILE, EXPANDABLE STRUCTURE, ASSEMBLY SUPPORT SYSTEM

(76) Inventor: Floyd L. Morrow, 4565 Ruffner St. #202-G, San Diego, CA (US) 92111

( * ) Notice: Subject to any disclaimer, the term of this patent is extended or adjusted under 35 U.S.C. 154(b) by 0 days.

(21) Appl. No.: 10/029,724

(22) Filed: Dec. 20, 2001

(65) Prior Publication Data

US 2003/0115808 A1 Jun. 26, 2003

(51) Int. Cl.[7] .............................. E04B 7/16; E04H 1/00; B62D 33/08; B60P 3/39; B60R 15/00
(52) U.S. Cl. .............................. 296/26.01; 296/26.02; 296/26.04; 296/165; 296/171; 52/64; 52/67; 52/79.5
(58) Field of Search ................................ 52/64, 66, 67, 52/68, 69, 71, 79.5; 296/26.01, 26.02, 26.04, 165, 169, 170, 171

(56) References Cited

U.S. PATENT DOCUMENTS

| | | | |
|---|---|---|---|
| 2,890,498 A | | 6/1959 | Bigelow |
| 3,304,668 A | * | 2/1967 | Edmonds ........................ 52/67 |
| 3,560,043 A | * | 2/1971 | Harter ........................ 296/171 |
| 3,596,416 A | * | 8/1971 | Hojka ............................ 52/64 |
| 3,650,556 A | * | 3/1972 | Ratcliff ........................ 296/171 |
| 3,866,365 A | | 2/1975 | Honigman |
| 3,941,414 A | * | 3/1976 | Platt ............................ 296/170 |
| 4,017,116 A | * | 4/1977 | Hulsey ........................ 296/156 |
| 4,545,171 A | * | 10/1985 | Colvin ........................ 52/79.5 |
| 4,603,518 A | | 8/1986 | Fennes |
| 4,850,268 A | | 7/1989 | Saito et al. |
| 4,958,874 A | | 9/1990 | Hegedus |
| 5,106,142 A | * | 4/1992 | Hegedus ................... 296/26.02 |
| 5,154,469 A | * | 10/1992 | Morrow ................... 296/26.02 |
| 5,185,973 A | * | 2/1993 | Oldani ............................ 52/64 |
| 5,345,730 A | | 9/1994 | Jurgensen |
| 5,596,844 A | | 1/1997 | Kalinowski |
| 5,761,854 A | | 6/1998 | Johnson et al. |
| 5,797,224 A | | 8/1998 | Gunthardt |
| 5,815,988 A | | 10/1998 | Molina |
| 5,921,033 A | * | 7/1999 | Molina ............................ 52/67 |
| 5,964,065 A | | 10/1999 | Migurski et al. |
| 5,966,956 A | | 10/1999 | Morris et al. |
| 6,135,525 A | * | 10/2000 | Amann ..................... 296/26.11 |

* cited by examiner

*Primary Examiner*—Brian E. Glessner
*Assistant Examiner*—Kevin McDermott
(74) *Attorney, Agent, or Firm*—Donn K. Harms (57) ABSTRACT

A low profile, expandable, mobile rigid structure with unique a unique assembly and support system, that can easily be transported by an average sized vehicle. The structure features a central structure with a central roof section, a pair of endwall assemblies, and a central floor mounted to a base. The endwalls are two pieced having a bottom endwall panel and a top endwall panel. From the side of the central structure one or more side sections are retractable and expandable to increase the size of the floor space inside. The two pieced endwalls allow for compaction of the structure for travel by translating the lower portion of the endwall from supporting the upper portion. A two pieced door allows entry into the structure when it is expanded.

16 Claims, 5 Drawing Sheets

MOBILE, EXPANDABLE STRUCTURE, ASSEMBLY SUPPORT SYSTEM

FIELD OF THE INVENTION

This invention relates to the field of portable structures. More particularly this invention relates to the field of mobile, expandable structures containing one or more rooms, that can easily be transported and assembled and conversely being equally as quick and convenient to disassemble for relocation. The expansion of these units is in both the horizontal and the vertical directions and provides for full support of the roof and upper walls without the need for hydraulics or other supports to keep the roof and upper portions elevated during use. These structures may or may not be permanently affixed to a framework with wheels to be towed by a motor vehicle. The unique method of erecting and supporting will be fully described within body of this patent.

BACKGROUND OF THIS INVENTION

There are many designs of mobile structures but most are burdened with a flimsy structure or are limited in the area into which they can expand, while others are cumbersome, awkward to transport, and labor intensive to assemble. Such portable light structures are usually in the trailer style and used for private accommodations while the larger units are designed to fulfill government contracts. The device as herein described and disclosed, will fully meet the structural requirements of a mobile commercial or military accommodation of one or more rooms while being low profile, light weight and easy to transport. It uniquely provides for full support of the upper portions upon lower portions and thus increases the load-bearing ability of the upper portions.

The need for adequate accommodations for disaster relief structures, that can be stored in a relatively small area and quickly dispersed to be set up as office space, medical room, temporary storage, maintenance and repair rooms, etc., has been made vary apparent recently. In the past there was a requirement that everything used for housing and relief had to travel over rough terrain to get to a desired activity site. With the development of the roads throughout the developed areas of the world, and the use of large air transport planes capable of vehicle transport, there is almost no place that is not accessible by some form of road system. With government and military requirements for portable structures, there has also not been a great deal of concern with weight because large vehicles usually transport units of this kind with the primary concern being, making them indestructible.

Problems arise when mobile structures of this kind become too heavy to be moved around easily in urban environments, often requiring a lot of heavy equipment for assembly. One of the many unique features of this invention is the capability of maintaining a lightweight solid structure while almost doubling the square footage of internal protected floor area. Additional problems arise in the time involved to assemble conventional cumbersome mobile structures.

The unique device herein disclosed describes a structure that is equipped with all the mechanisms required to easily erect and be fully assembled by one or two people in less than ten minutes, with the same time required for disassembly. An additional feature of this structure is that the floor inside the erected structure is completely flat and provides a large working area. The erected structure features a roof and upper sides and ends that are fully supported by a translateable lower endwall thus elevating the stress on conventional hydraulic and screw extensions during long term use. Also paramount to the development of the disclosed device was to provide a portable housing unit of this kind, keeping the weight down while being structurally solid enough to meet the stringent structural requirements of government and military contracts.

U.S. Pat. No. 2,890,498. of Floyd E. Bigelow relates to a portable building, and more particularly to a house or cabin structure made up of separate parts which may be easily assembled and disassembled and which disassembled may be formed into a compact assemblage for covenant storage or transportation. This structure does not have a central framework, and would not be convenient to transport over the highway to a disaster site, or work well for portable offices.

U.S. Pat. No. 3,866,365 of Michael L. Honigman describes expandable structural modules for space enclosures that incorporate a number of sophisticated mechanisms to assemble a device used as cabin trailers or camper units. This device cannot achieve extended lengths and would not be practical for a commercial of government enclosure.

U.S. Pat. No. 4,603,518 of Walter Fenns describes a collapsible building, which is mounted on the platform of a conveyance that has a first elongated unit mounted on a platform, and a pair of collapsible elongated units, which flank the first unit when the building is fully erected. This is a large heavy structure requiring a semi truck to transport and it does not present a low profile when towing.

U.S. Pat. No. 4,850,268 of Kenichiro Saito et al, describes a multi-purpose laboratory room for mobile applications. The room comprises a housing structure having an airtight laboratory unit, an entrance unit and an air-conditioning system. This is a specialized structure, not easily transported or used for other applications.

U.S. Pat. No. 4,958,874 of Leslie J. Hegedus discloses a mobile unit comprises a lorry trailer having sidewall portions, which pivot down to form a large floor and upwardly slideable panels or frames from which unfold side roof portions. This invention discloses a trailer-mounted structure that is very complicated and time-consuming to erect. It does not supply a low profile when towing.

U.S. Pat. No. 5,345,730 of Bruce A. Jurgensen teaches of an expandable structure, which may be expanded on a selected site into a composite structure incorporating the core structure and a contiguous expanded section. This is another patent that discloses a device that will only expand laterally and cannot be lowered to create less wind resistance when being towed.

U.S. Pat. No. 5,761,854 of Brian D. Johnson et al, describes a container with fold down sides to create an expanded structure. This again is another patent that discloses a device that will only expand laterally and cannot be lowered to create less wind resistance when being towed.

U.S. Pat. No. 5,797,224 of Ray R. Gunthardt describes a multitude of structures composed of many intricate parts and mechanism, all of which would create a great deal of weight and be very complicated to erect.

U.S. Pat. No. 5,815,988 of Jose Raymon Molina teaches of an expandable retractable portable structure having a movable portion hingedly connected to a stationary portion. This patent is similar to the Fennes U.S. Pat. No. 4,603,518 having a complete side unit hinge out from a central unit producing a high profile when towing.

U.S. Pat. No. 5,964,065 of Tomasz K. Migurski et al, discloses an advanced vehicle-transportable field emergency medical system, comprising surgical suites deployed from a core module, each expanding to form an enclosed surgical treatment room with perimeter tenting space. This patent relates to a complicated, specialized structure with a specific purpose taking a great deal of time to erect by people who were familiar with the intricacies of the device.

U.S. Pat. No. 5,596,844 of Juan R. Kalinowski describes a foldable portable building that be collapsed to fit within the outside dimensions of an internationally standardized (ISO) goods container. This patent describes a very heavy unit when it is in the collapsed state and very complicated to erect.

U.S. Pat. No. 5,966,956 of Leland M. Morris et al, teaches of a portable unit which is foldable to be shipped and transported as a standard cargo shipping container. This is another patent that describes a heavy structure that is cumbersome and heavy to transport.

As such, there is a need for a structure that is fixated on a central framework and easy to transport by towing or trucking. Such a device should have a low profile to facilitate movement where low passage height exists. Such a device should be compact yet an expandable structure that is easily erected in a minimum amount of time by a minimum number of people. Further, such a device should be structurally sturdy and self supporting of the upper structure by the lower portion of the structure to alleviate stress on hydraulic or similar expansion means during long term use of the expanded unit.

SUMMARY OF THE INVENTION

The invention herein disclosed relates to a new and unique system for assembling and supporting mobile, expandable structures that accommodate one or more rooms. More specifically, these structures will expand on both length and width outwardly at the same time and then elevate all the roof members together in a secondary operation to a desired height, which in the current best mode is substantially eight feet. Once so elevated, the roof and upper wall portions are structurally supported in their elevated position by lower walls which translate into a position to register in line with the upper walls and thereby support the upper half of the structure securely during the expanded mode.

The expanding and elevating of the roof members is provided by a central means to elevate the roof member and a means to expand the sides which in the current best mode is provided by hydraulic cylinders communicating with pressurized fluid from motor energized pumps. However those skilled in the art will realize that other common mechanical means, such as screw jacks or cables and motors and similar come along type devices could be used and such are anticipated. A secondary manual back-up expansion system will achieve all the same results in the event that there is not enough power in the batteries to operate the preferred hydraulic system.

The structures may be mounted on a variety of vehicles or on fixed foundations and could even be dropped on site by a helicopter or large truck. Because of the large area of unobstructed floor space yielded by the expanded device and unique folding floor elements, the internal configuration can consist of a single large room, two or more smaller rooms with a kitchen and restrooms being other additional options.

When transporting the structure all components which expand to the erected structure will be best transported in the retracted positions. Upon arrival at the desired erecting sight, when vehicle mounted as in the current preferred mode, the structure base will first be leveled and stabilized by actuating the hydraulic levers in a hydraulic control box on the tongue at the front of the structure. Four of these controls operate the hydraulic jacks at the four corners of the central frame forming the base, which are the means used to initially level the base of the device. Next, the hydraulic motor energizes the hydraulic rams or cylinders that extend the two opposing side sections can be activated with another lever in the hydraulic control box. This provides the means to laterally translate the side sections from a first retracted position inside the interior cavity of the central structure, formed between the central top unit and the central bottom unit, to the extended position. The length of the expandable side sections is described, but not limited to the full length of the interior cavity of the mobile, expandable structure. Each side section may vary in length and location on the mobile, expandable structure and still be covered within the scope of this patent. When the side sections are fully extended the central roof section and the side section roof panels are interlocked together to form a watertight seal. Then the support legs on the corners of the side sections are manually extended to the ground to fully stabilize the complete structure.

The next operation is to activate the hydraulic lever in the hydraulic control box as a means to raise all the roof elements at the same time with the central hydraulic cylinder. The roof elements must be raised above their fixed position preferably at least two inches allowing a gap for the front and back bottom wall panels to be repositioned before lowering. Telescoping guide cylinders at the four corners of the central frame align the top and bottom sections. The top and bottom wall panels at the front and back are aligned with a means for cooperative in-line engagement currently provided by alignment pins and bushings. This unique interlocking feature allows that when bottom sections of both end wall panels are relocated from their position in the interior cavity and under the top sections of the end wall panels, and the roof elements are lowered into their fixed position, the top sections will be fully supported by the bottom sections and form a seal thereon combining to a solid wall section, both in the front and back of the structure. A means to translate the bottom wall panel of the end wall panel assemblies, from a first position out of line with the centerline of the top wall panels to a secondary position registered with inline with the centerline of the top wall panel provides this unique function which in the current best mode is two or more beveled locating pins extending from the top edge of the bottom wall panel to engage within orifices in bushings located along the bottom edge of the top wall panel. This registered sealed engagement is combined with a slide or hinged translation of the bottom section. By translating the bottom sections into cooperative sealed registered engagement with the top sections of the endwalls, the primary load of the roof component of the locked side section roofs and central roof section and the upper portions of the wall attached thereto is removed from the central hydraulic cylinder and translated to the end walls. During long term use of the device, this provides relief to the hydraulic cylinder or other elevation means from the constant weight of these sections. It also provides added safety to the inhabitants of the structure since the potential for collapse of the upper section onto the bottom is elevated by the bottom endwalls supporting all the weight inline. In the event that the roof is covered with snow or ice or soil increasing the weight of the upper section, the support scheme provided by the engagement of the lower endwalls inline and sealed with the upper endwalls provides extra load bearing and safety to the occupants.

At least one door but preferably two doors with one in both the front and back end wall panels are preferably formed of two sections and operate like a common Dutch door. By using the two piece endwalls with half the door on each, the door handle and lock on the lower section and a second lock on the upper section, both swing independently. However, a registered and permanently engaged door of two sections might also be used. Windows in the doors and wall panels will be at the option of the customer requirements.

In the preferred embodiment the floor panels for the side sections will be lowered and raised automatically with straps that are attached to the lower edges of the top sections. When the top section is raised, the strap communicating between the top section and the floor section slackens and both side section floor panels are lowered into position flush with the center floor section thus creating a completely flat floor. The straps are then disconnected and stored. In this preferred embodiment, the floor panel hinge will attach on the outermost lower edge of the bottom section on each of the side sections to result in a completely flat floor surface when the device is in the fully extended position with both sides extended.

A second embodiment would feature the same center section arrangement but the floor panels will have the floors of the side sections hinging on the inner edge attached to the central frame structure to be manually lowered to form a completely flat floor.

A third preferred embodiment would again use essentially the same center section arrangement but will have the complete bottom side section with the floor included, hinging on the inner edge attached to the central frame structure. This will form area with sealed containment area to keep equipment and supplies in a clean environment when being transported or stored. This embodiment of the invention will also have a completely flat floor surface. The preferred embodiment of the top section of the side sections will be constructed of, but not limited to a one-piece fiberglass section. The top section will consist of a front and rear end panel, a pair of side panels and a roof panel. Both top and bottom sections will have side panels that may or may not have one or more windows to be determined by the customer's requirements.

In an additional preferred embodiment to reduce weight should that be desired, the top sections of the side sections will be a tubular framework covered with a waterproof fabric. Not only covering the ends, sides and top of the side sections, the fabric may extend past the side wall to create a retractable awning. The fabric used for covering the top sections of the side sections may incorporate flexible photovoltaic cells for generating operating power for the structure.

An alternate preferred embodiment of the structure will have one each of the end wall panels of two separate structures replaced with header units to accommodate the mating together of two or more structures when placed back-to-back thus forming twice the open flat floor area of a single structure.

An object of this invention is to provide a mobile, expandable structure that when retracted or assembled will pass the rigid structural specifications and requirements of commercial and government contracts.

Another object of this invention is to provide a mobile, expandable structure that is not excessively heavy.

A further object of this invention is to provide a mobile, expandable structure that can be extended and setup in less than ten minutes.

An additional object of this invention is to provide a mobile, expandable structure that when fully extended will be close to twice the retracted size.

Still another object of this invention is to provide a mobile, expandable structure that when extended will have an eight foot ceiling and completely flat floor with vertical walls.

A further object of this invention is to provide a mobile, expandable structure with wall, end panels and doors that can be equipped with glass windows.

Yet another object of this invention is to provide a mobile, expandable structure with a two-part front and back wall panel system that interlocks to form two rigid end wall units with the weight of the top half of the structure fully supported by the bottom endwalls.

Another object of this invention is to provide a mobile, expandable structure that the two top sections of the side sections can be covered with a waterproof photovoltaic material that will generate electrical power.

Still another object of this invention is to provide a mobile, expandable structure with expandable side sections that may be rotated in and out of place and form a sealed compartment with the central floor area.

An additional object of this invention is to provide a mobile, expandable structure that can be retracted to have a narrow low profile, to be easily towed behind a motor vehicle on the street.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

Accompanying drawings, which are incorporated in and form a part of this specification, illustrate embodiments of the invention and together with the description, serve to explain the principles of the invention.

DETAILED DESCRIPTION OF THE PREFERRED EMBODIMENTS

Figures 1, 2:
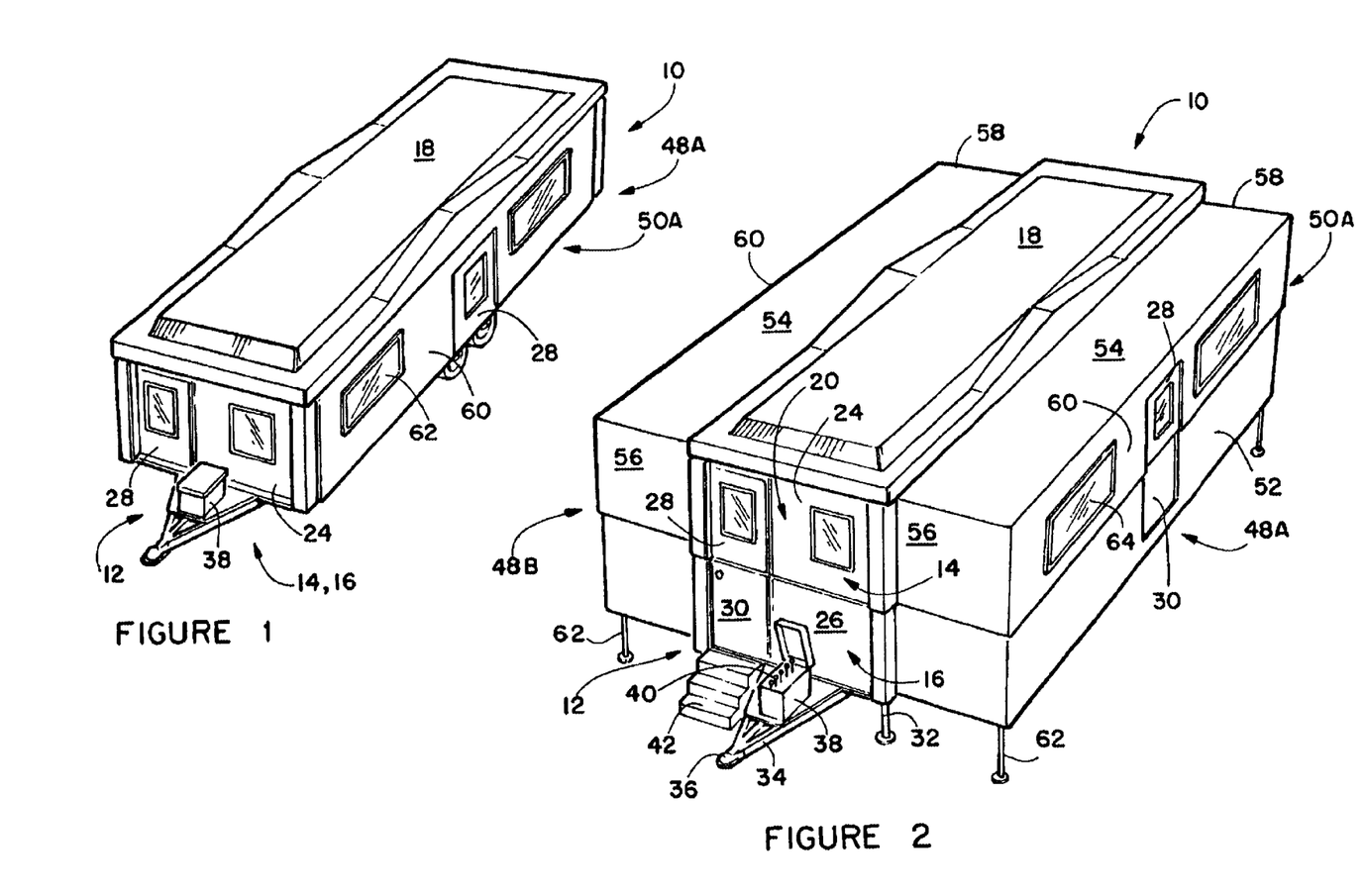
FIG. 1 depicts a perspective view of the disclosed mobile, expandable structure in the retracted state ready for transporting.
FIG. 2 depicts a perspective view of the mobile, expandable structure, in the expanded condition

Referring now to the drawing FIG. 1 shows the mobile, expandable structure 10, in the retracted position. The central structure 12 consists of a top unit 14 shown covering a central structure bottom unit and having one-piece central roof section 18. At the distal ends of the central structure 12 is a top wall panel 24 and a bottom wall panel 26 which translates inline and inter locks to form the rigid end wall panel assembly 20. Typical end wall panel assemblies 20 at both ends of the central structure 12 will incorporate a Dutch style door with top door member 28 and bottom door member 30. The door members in the current best mode will operate independently, both having separate locking capabilities, also being able to interlock together working as a single door unit.

A means to translate the bottom wall panel 26 of the end wall panel assembly 20, from a first position out of line with the centerline of the top wall panel 24 to a secondary position inline with the centerline of the top wall panel 24 is provided to allow such separation. This is done by translating the bottom wall panel 26 toward the interior of the central structure 12 and out of line with the top wall panel 24 to allow the endwall assembly 20 and attached central roof section 18 to collapse to the contracted position of FIG. 1 for transport. Also provided is a means for cooperative registered engagement between the bottom edge of the top wall panel 24 and the top edge of the bottom wall panel 26 in the form of two or more beveled locating pins 82 extending from the top edge of the bottom wall panel to engage within an orifice 84 in bushings 86 located along the bottom edge of the top wall panel 24.

The base of the central structure 12, provided here by the frame assembly 70, has four hydraulic elevating jacks 32 built in at each corner providing a means to level the base of the central structure. An interior cavity is defined in the central structure 12 by the area below the central roof section 18 and between the two endwall assemblies 20. At the front of the central structure 12 is a towing tongue 34 with a towing ball receiver 36 thereby allowing the device to be towed on the wheels attached to the frame assembly 70. As noted above, in some instances the disclosed device 10 might be used without wheels 35 where it is transported on the back of a truck or in an airplane and just moved to position with a forklift or the like. The current best mode does feature wheels 35 since they ease the transport of the device 10 no matter what manner it is transported. Portable steps 42 will be available to be placed in front of the doors at either end of the central structure 12. Mounted on the tongue 34, the preferably watertight hydraulic control box 38 houses the hydraulic actuating levers 40. By operating the hydraulic control levers 40, the structure cannot only be leveled on the desired site, but the expandable first side section 48A and the expandable opposing second side section 48B can be extended into the extended position from the retracted position from the same control location. Although two expandable side sections 48A and 48B are shown it must be understood that the mobile expandable structure could incorporate only a single side section 48, and while not yielding as much floor space would still be anticipated within the scope of this patent and using the two piece supporting endwall assemblies 20 described above, would be a great improvement in portable structures.

The two expandable side-sections 48A and 48B are typical in their basic configuration with two alternate embodiments of the top section 50A and 50B and bottom side wall section 52. In the embodiment of the expandable side sections 48A and 48B, top section 50A is composed of a roof panel 54, a first upper end panel 56 and second upper end panel 58, and upper side panel 60. The side sections, when extended from their retracted position inside the central cavity 71, will be supported at their distal ends by side section support legs 62 that are manually positioned while raising the central structure 12 with the hydraulic leveling jacks 32 at the four corners. Optional windows 64 can be added in any of the upper side panels 60 or either of the top wall panels 24 of the endwall assembly 20 or to the top door member 28 optionally and to improve viewing from inside.

Figure 3:
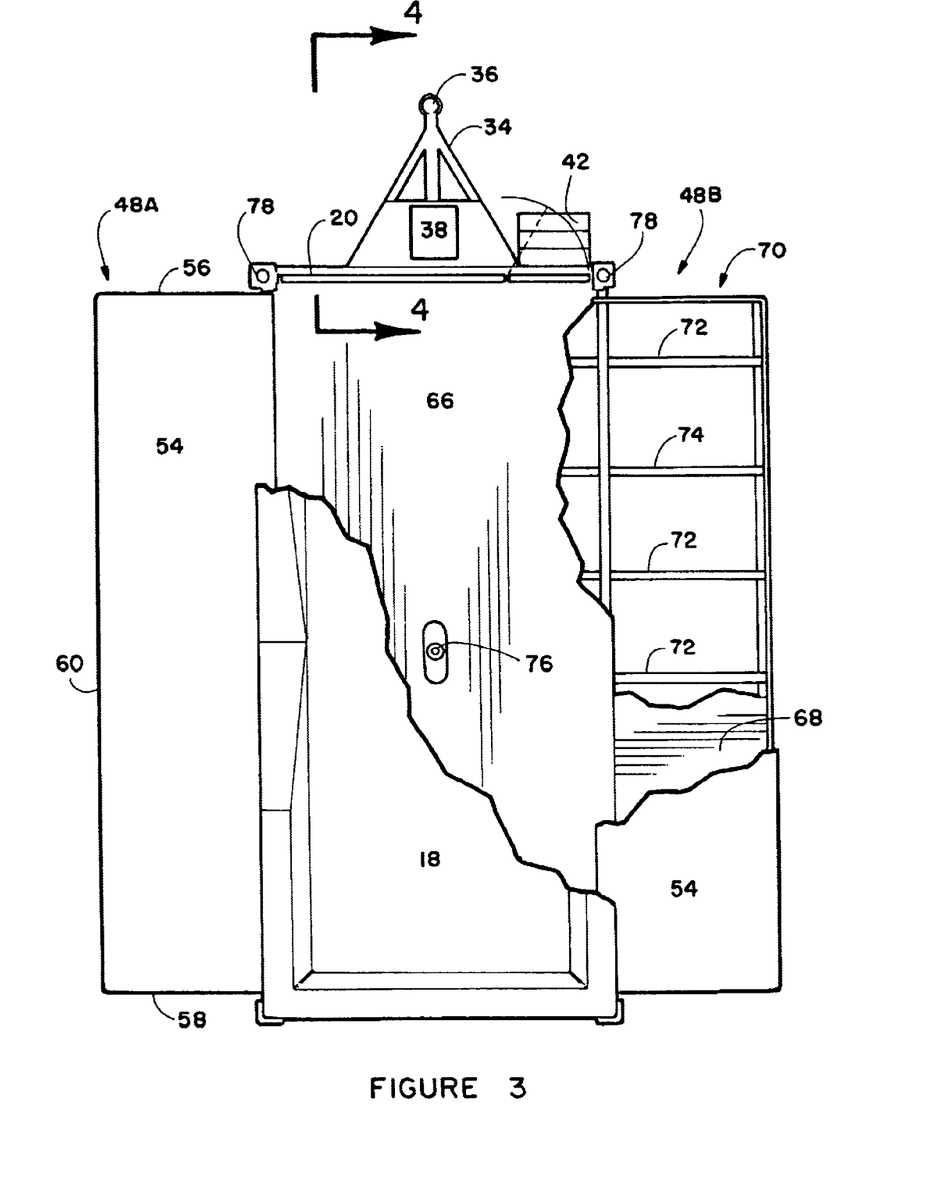
FIG. 3 depicts a top view of the mobile, expandable structure in the expanded state showing a portion of the roof cut away to display the floor areas. A portion of the side floor panel has been cut away to display the frame members.

FIG. 3 displays a plan view of the mobile, expandable structure 10 in the expanded condition with a portion of the central roof section 18 cut away along with a portion of the side roof panel 54, to reveal the central floor panel 66 and the preferred embodiment of the side floor panels 68A. Also the floor panels 66 and ER have been cut away to display the frame assembly 70 forming the base. Extending the guide rails 72 and the expansion activating rails 74 facilitates the expansion of the side sections' 48A and 48B from the retracted position with the side sections 48a and 48b and roof panel 54 inside the central cavity 71 to the expanded position projecting from the sides of the central structure 12. A means to translate the expandable side sections 45A and 48B from a first retracted position inside the interior cavity of the central structure 12, formed between the central top unit 14 and the central bottom unit 16, to the extended position is provided in the current best mode by the hydraulic cylinders communicating elongation and contraction to the activating rails 74 which move the entire side section in and out of the interior cavity 71 as needed. The maximum length of the expandable side sections 14 and 16 is described, the full length of the interior cavity 71 between the endwall assemblies 20. Each of side sections 48A and 48B, may vary in length and location on the mobile, expandable structure 10 and still be covered within the scope of this patent. The width of the side sections 14 is dictated by the width of the interior cavity 71 in that they must substantially retract therein consequently one half the width of the interior cavity 71 would be the best maximum width to achieve maximum compaction in the retracted position. However a larger mobile expandable structure 10 could be achieved by allowing the side sections 14 to overhang the sides of the central cavity 71 if desired in some applications.

The central roof section 18 is cooperatively engaged with the two side top sections 50A or 50B and the roof panels 54 of the sides such that they will raise and lower as a single unit. Centrally located within the structure 12 is a means to raise and 3 lower the central roof section 18 and the two side sections' 50A or the alternate embodiment sections 50B along with the communicating roof panels 54, which in the current best mode is the hydraulic jack cylinder 76. Thus, as the hydraulic jack raises and lowers the central roof section 18 all the other aforementioned cooperatively engaged parts raise and lower with it. Also, in the current best mode, as the central hydraulic jack 76 raises the roof, four telescoping guide cylinders 78 at the corners help maintain the central structure top 14 and the central structure bottom 16 aligned in registered engagement with each other.

Figure 4:
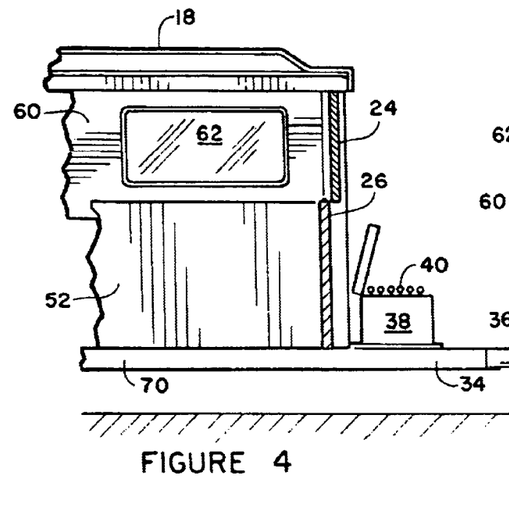
FIG. 4 is a section through the mobile, expandable structure illustrating the top and bottom front wall panels in the erecting position.

FIG. 4 is a section view through the expanded mobile structure 10, viewing the end wall assembly 20 in the erecting position where top wall panel 24 is rigidly attached to the top of the central structure 12 and the bottom wall panel 26 is adjustably attached to the frame assembly 70 providing the base. As shown, the bottom wall panel is positioned inside of the top wall panel 24 during expansion and contraction of the upper section during set up. This allows the top wall panel 24 and thus the central roof section and attached side roof sections 54 to drop down much more compact for transport by allowing the top wall panel 24 to laterally translate by the bottom wall panel 26.

Figure 5:
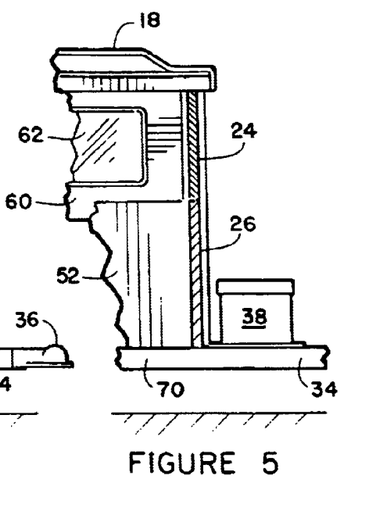
FIG. 5 is a section through the mobile, expandable structure illustrating the top and bottom front wall panels in the interlocked position descended from the erecting position of FIG. 4.
Figure 6:
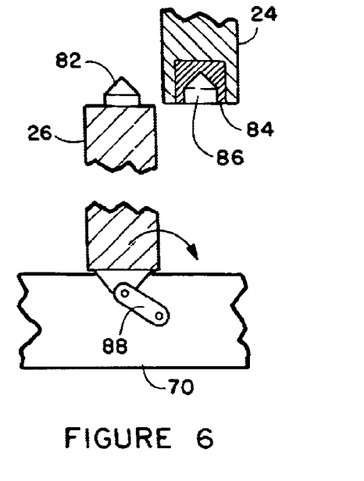
FIG. 6 is a detail of the two piece endwall segments in the erecting position.

FIG. 5 is a section through the mobile, expandable structure 10 illustrating the top wall panel 24 and the bottom wall panel 26 in alignment forming a rigid wall panel 20 when in the expanded or fully erected position. FIG. 6 further illustrate the panels 24 and 26 in the erecting position with the wall panel alignment pin 82 located on the top edge of the bottom wall panel 26 thereby providing a registration means between the two. A bushing 84 with an alignment orifice 86 is located on the lower edge of the top wall panel 24. A means to translate the bottom section of the endwall from a first position out of line with the center line of the upper endwall to a position inline with the center line of the upper endwall is provided as depicted by relocating linkage 88 located on the bottom edge of bottom wall panel 26 attached to the frame assembly 70, facilitating the adjustment of the wall panel 26 directly under top wall panel 24 by rotating it on the relocating linkage 88. Another such means could be provided by sliding mechanism and thus achieving the same results that will be covered within the scope of this patent, however the current best mode features the relocating linkage 88 to simply rotate the bottom wall panel 26 out of the way of the top wall panel 24 to allow them to laterally translate in relation to each other during lowering of the upper section.

Figure 7:
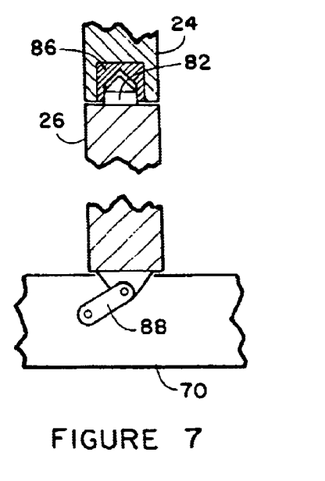
FIG. 7 is a detail of the two piece endwall segments in the in the interlocked and load supporting position.

FIG. 7 illustrates the wall sections 24 and 26 in the interlocked position in registered engagement with each other. As noted, a great advantage is gained by translating the bottom wall panel 26 in line with the top wall panel 24 by communicating the weight of the central roof section 18 and the engaged side roof sections 54, upper side panels and upper end panels 56 all engaged with to central roof section 18, to the bottom wall panels 24 when the top and bottom wall panels are so engaged and thereby become a rigid weight bearing element of the structure.

Figure 8:
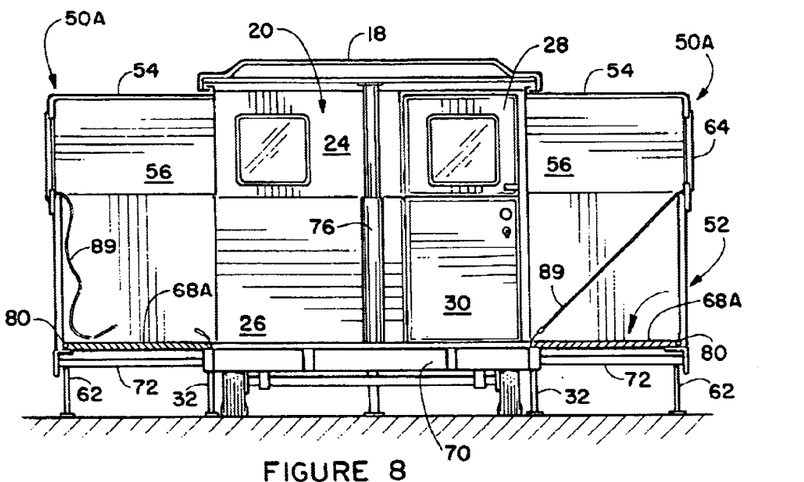
FIG. 8 is a section through the expanded mobile, structure, viewing the typical wall panels, illustrating the preferred embodiment of the side section floor panel.
Figure 9:
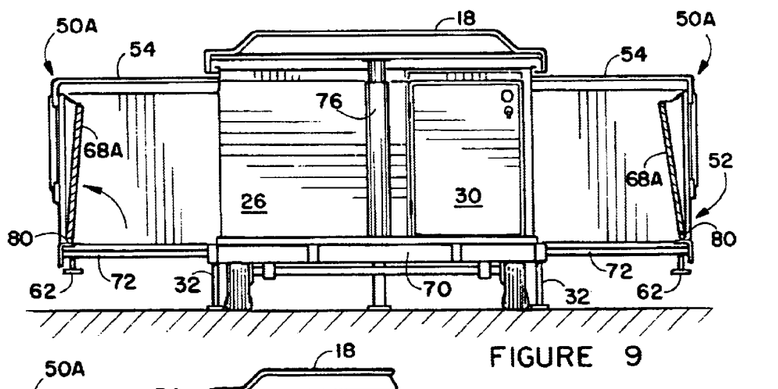
FIG. 9 is a section through the mobile, expandable structure with the roof panels and upper section lowered, and illustrating the operation of the preferred embodiment of the side section floor panels.
Figure 10:
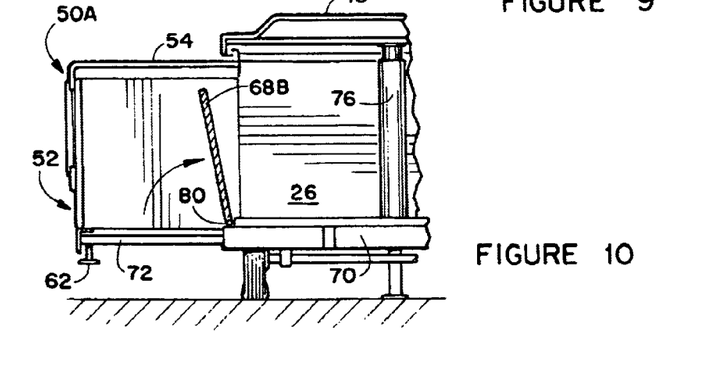
FIG. 10 is a section through the mobile, structure with the side section top in the lowered position, illustrating the operation of the second embodiment of the side section floor panels.

FIG. 8 is a section through the expanded mobile structure 10 illustrating the preferred embodiment of the side floor panels' 68A pivoting on the floor panel hinge mechanism 80, with the floor panel lifting straps 89 and the attaching means 92. This strap mechanism provides a means to automatically raise and lower the floor panels 68A when the top section 50A is raised and lowered, in this case by the hydraulic jack cylinder 76. Each lifting strap is attached to a lower edge of the expandable side top section 50A and hooked to the attaching means 92 on the end of the floor panel 68A opposite the hinge 80 so that when the side section top 50A is raised the strap 89 translates over the edge of the side section bottom lowering the side section floor panel 68A. This operation acts in reverse raising top section 50A raises all the parts cooperatively engaged and raises the side section floor panel 68A when the side section top 50A is raised illustrated in FIG. 9.

Figure 11:
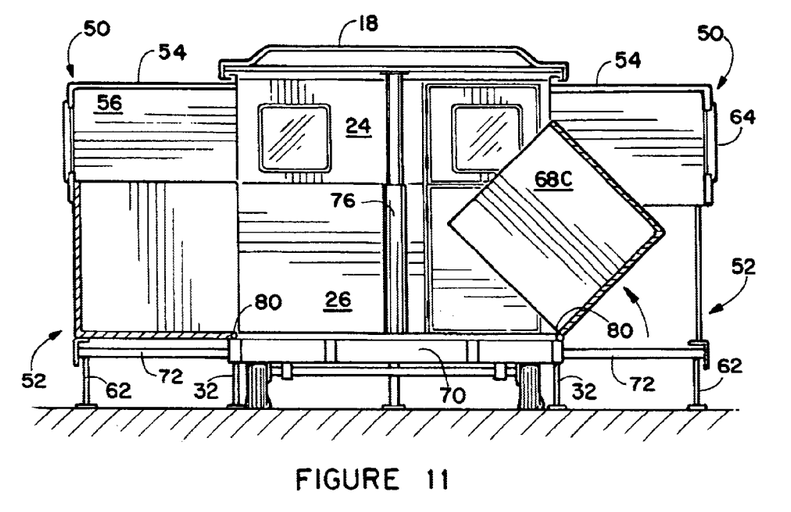
FIG. 11 is a section through the mobile, structure with the roof panels lowered, depicting the operation of the third embodiment of the side section floor panels.

FIG. 11 is another section through the mobile from one end, showing the expandable structure 10 depicting the operation of the K third preferred embodiment with the side section 48A attached to the side floor panel 68C pivoting into the central cavity 71 for transport. This embodiment would function the same in all other aspects except that the side floor panels 68a would be attached to the bottom side wall section 52 and the lower side end panels 59 as a complete lower side unit and it would rotate in and out of the central cavity 71 on a hinge 80.

Figure 12:
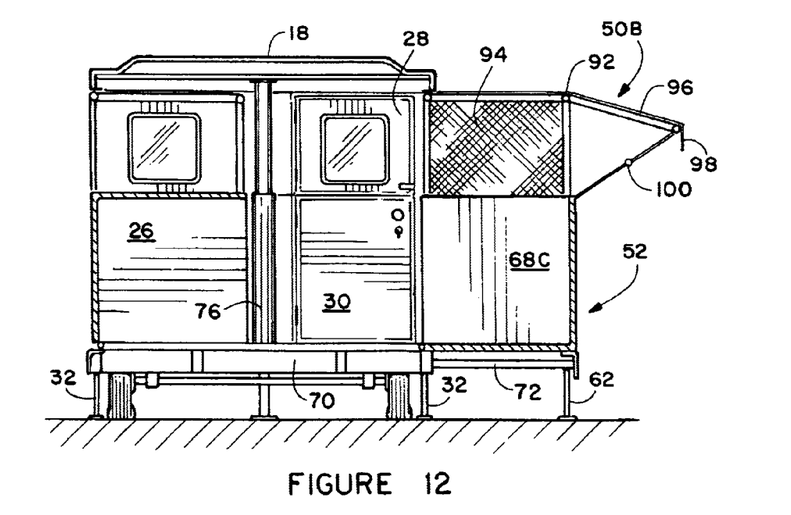
FIG. 12 is a section through expanded mobile, structure with one side and the roof in the extended position, illustrating the second preferred embodiment of the side section top section with fabric cover and awning.

FIG. 12 is a section through the mobile, expandable structure 10 illustrating another preferred embodiment of the expandable side section top section 50B with a waterproof fabric covering 94. The waterproof fabric covering 94 is held in place with a tubular framework 92 and also incorporates an awning extension 98 with an awning framework 96. The awning extension 98 will have a hingeable support mechanism 100 to make angular adjustments in the awning. This embodiment would work well with the embodiment of the rotating lower section of FIG. 11.

While the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth in the following claims.

What is claimed is:

1. A mobile expandable structure comprising:
a central structure, said central structure having a central roof section, a pair of endwall assemblies, and having a central floor mounted to a base;
the area between said central roof section and said floor and said endwalls defining a central cavity;
said endwalls having a bottom endwall panel and a top enawall panel, said top endwall panel communicating with said central roof section at a first end and extending downward to a distal end;
at least one side section;
said side section having a side roof section and a side base with a side floor panel thereon;
said side section having a side wall, said side wall having an upper sidewall section and lower sidewall section attached to said side base;
said side section having side endwalls, said side endwalls each having an upper side endwall panel and a lower side endwall panel attached to said side base;
said side section translatable from a stored position retracted into said central cavity to an expanded position projecting from said central cavity;
said central roof section, said side roof section, said upper sidewall, and said upper side endwall panels cooperatively engaged to concurrently elevate together as an upper unit, from a static position adjacent to said base, to an elevated position elevated above said base;
means to raise and lower said upper unit between said static position and said elevated position;
means to translate said side unit from said stored position to said expanded position;
a door entry means communicating between said central cavity and the exterior of said mobile expandable structure;

said door entry means formed of an upper door section and a lower door section;

said upper door section formed in one of said upper sidewall or said upper side endwall panels; and said lower door section formed in one of said lower sidewall or said lower endwall panels and directly under said upper door section.

2. The mobile expandable structure of claim 1 additionally comprising:

said top end wall panel having a top center axis extending vertically therethrough from said first end to said distal end;

said bottom endwall panel having a bottom edge adjacent to said base and having a top edge opposite said bottom edge and having a bottom center axis extending therethrough between said top edge and said bottom edge;

each of said bottom endwall panel translatable from a first position wherein said bottom center axis is adjacent to said top center axis, to a support position wherein said bottom center axis is substantially inline with said top center axis, and said top edge of said bottom endwall panel mates with and supports said top endwall portion at said distal end of said top endwall, whereby, said weight of said upper unit is supported by said bottom endwall portion.

3. The mobile expandable structure of claim 1 wherein said central floor panel has a top surface and said side floor panel has a top surface, said top surface of said central floor panel and said top surface of said side floor panel being substantially level with each other when said side section is in said expanded position thereby yielding single substantially flat floor surface in said central cavity and said side section.

4. The mobile expandable structure of claim 3 wherein said side floor panel is rotationally attached along a first edge adjacent to said side base and rotates to a transport position, said transport position being vertically inclined in relation to the top surface of said central floor panel whereby said side floor panel is placed in said transport position when said side section is translated to said stored position.

5. The mobile expandable structure of claim 4, further comprising:

means to automatically move said side floor panel to said transport position when said side section is translated to said stored position.

6. The mobile expandable structure of claim 5 wherein said means to automatically move said transport position when said side section is translated to said stored position comprises:

a strap having a first end and a second end;

said first end attached to said side floor panel at a distal edge opposite said first edge of said side floor panel; and said second end of said strap attached to said upper sidewall sect ion whereby said strap rotates said side floor panel to said stored position when pulled by said upper sidewall section moving to said static position.

7. The mobile expandable structure of claim 3 wherein said side floor panel is rotationally attached along a first edge and rotates to a transport position, said transport position being vertically inclined in relation to the top surface of said central floor panel whereby said side floor panel is placed in said transport position when said side section is translated to said stored position.

8. The mobile expandable structure of claim 4 wherein said side floor panel is rotationally attached along a first edge and rotates to a transport position, said transport position being vertically inclined in relation to the top surface of said central floor panel whereby said side floor panel is placed in said transport position when said side section is translated to said stored position.

9. The mobile expandable structure of claim 2 wherein said side floor panel is rotationally attached along a first edge and rotates to a transport position, said transport position being vertically inclined in relation to the top surface of said central floor panel whereby said side floor panel is placed in said transport position when said side section is translated to said stored position.

10. The mobile expandable structure of claim 2 wherein the number of side sections is two.

11. The mobile expandable structure of claim 2, wherein said side base and said lower sidewall section attached to said side base and lower side endwall panel attached to said side base are rotationally engaged along one edge of said side base to said base of said central structure and said side section rotates into said stored position.

12. The mobile expandable structure of claim 1 wherein said side root section, said upper sidewall section, and side endwall upper side endwall panels, are formed of a fabric awning.

13. The mobile expandable structure of claim 1 wherein said side base and said lower sidewall section attached to said side base and lower side endwall panel attached to said side base are rotationally engaged along one edge of said side base to said base of said central structure and said side section rotates into said stored position.

14. The mobile expandable structure of claim 1 wherein the number of side sections is two.

15. The mobile expandable structure of claim 1 wherein said side floor panel is rotationally attached along a first edge and rotates to a transport position, said transport position being vertically inclined in relation to the top surf ace of said central floor panel whereby said side floor panel is placed in said transport position when said side section is translated to said stored position.

16. The mobile expandable structure of claim 1 wherein said base of said central section is mounted on an axle with wheels.

* * * * *